United States Patent [19]

Lata et al.

[11] Patent Number: 4,853,888

[45] Date of Patent: Aug. 1, 1989

[54] PROGRAMMABLE MULTIFUNCTION KEYBOARD

[75] Inventors: Walter J. Lata, Renton, Wash.; Michael S. Trupiano, Burnsville, Minn.

[73] Assignee: The Boeing Company, Seattle, Wash.

[21] Appl. No.: 687,911

[22] Filed: Dec. 31, 1984

[51] Int. Cl.⁴ ............................ G06F 3/02; G09G 3/00
[52] U.S. Cl. ........................................ 364/900; 341/23
[58] Field of Search ................. 340/712, 365 VL, 715; 364/709, 200 MS File, 900 MS File; 371/11

[56] References Cited

U.S. PATENT DOCUMENTS

| | | | |
|---|---|---|---|
| Re. 31,523 | 2/1984 | Baker | 455/77 |
| Re. 32,040 | 11/1985 | Bagley | 364/900 |
| 3,171,114 | 2/1965 | Butler et al. | |
| 3,222,597 | 12/1965 | Beatenbough et al. | |
| 3,521,161 | 7/1970 | Kurata et al. | |
| 3,670,322 | 6/1972 | Mallebrein | 340/712 |
| 3,719,937 | 3/1973 | Doyle | 340/715 |
| 3,879,722 | 4/1975 | Knowlton | |
| 4,028,695 | 6/1977 | Saich | |
| 4,048,482 | 9/1977 | Charransol et al. | 371/11 |
| 4,078,257 | 3/1978 | Bagley | |
| 4,121,283 | 10/1978 | Walker | |
| 4,135,662 | 1/1979 | Dlugos | |
| 4,184,146 | 1/1980 | Fratzke et al. | 340/52 F |
| 4,188,625 | 2/1980 | Hodemakers | 340/715 |
| 4,200,913 | 4/1980 | Kuhar et al. | 364/900 |
| 4,218,745 | 8/1980 | Perkins | |
| 4,274,081 | 6/1981 | Nomura et al. | |
| 4,280,121 | 7/1981 | Crask | |
| 4,313,108 | 1/1982 | Yoshida | 340/712 |
| 4,333,090 | 7/1982 | Hirsch | |
| 4,404,547 | 9/1983 | Zybailo et al. | |
| 4,480,305 | 10/1984 | Watson et al. | 364/200 |
| 4,551,717 | 11/1985 | Preher | 340/365 VL |
| 4,588,883 | 5/1986 | Abbas | 250/551 |

FOREIGN PATENT DOCUMENTS 57-81641  5/1982  Japan ......................... 340/365 VL

OTHER PUBLICATIONS

Radio Shack Dictionary Of Electronics, by Rudolf F. Graf (1974), p. 404.
*IBM Technical Disclosure Bulletin*, vol. 27, No. 5, Oct. 1984, "*Keyboard Definition Function*", by Bradney et al., pp. 2992-2994.

(List continued on next page.)

*Primary Examiner*—Gary V. Harkcom
*Assistant Examiner*—Lawrence E. Anderson
*Attorney, Agent, or Firm*—Christensen, O'Connor, Johnson & Kindness

[57] ABSTRACT

A programmable, multifunction keyboard system in which the key configurations and the relationships between key configurations are fully specified by a data base. The keyboard system comprises a keyboard (16) having a plurality of keys (18), each key comprising a switch (68) and display means (66) for displaying a legend visually associated with the switch, and actuation control means (46) for monitoring the switches and providing an actuation signal identifying an actuated switch. The system further comprises a processor (12) that includes means for storing a data base (80). The data base comprises a plurality of control pages (82), each control page (90) including legend data (96) and next page data (98). The legend data specifies a legend for display in association with at least one of the switches, and the next page data specifies a next control page associated with at least one of the switches. The processor further comprises means for designating one of the control pages as the active control page, and means responsive to the actuation of a selected switch to redesignate the active control page based upon the next page data corresponding to the selected switch. The actuation means may comprise means for detecting a switch that may be inoperative, and the processor may include reconfiguration means for reconfiguring each active control page such that legend data and next page data is not associated with an inoperative switch.

7 Claims, 13 Drawing Sheets

OTHER PUBLICATIONS

*Development of Preliminary Design Concept for Multifunction Display and Control System For Orbiter Crew Station, Task* 3 (Concept Analysis), by Spiger, R. J. et al., 7/29/82.

"PPS-A Switch in Time?", R. J. Spiger et al., NAECON '82, National Aerospace & Electronics Conference, Dayton, Ohio, May 18-20, 1982.

"Automation of Crew Procedures Using Multifunction Display and Control Systems", R. J. Spiger et al., Boeing Aerospace Co., pp. 371-378.

"Variable Keyboard for Terminal Displays", IBM Technical Disclosure Bulletin, vol. 16, No. 2, Jul. 1973, pp. 575-576, T. F. Cummings.

"Programmable Key/Display/Switch Device", S. E. Bigbie et al., IBM Technical Disclosure Bulletin, vol. 21, No. 2, Jul. 1978, pp. 442-444.

"Programmable Keytop Employing Electrochromic Display", I. Jones, IBM Technical Disclosure Bulletin, vol. 21, No. 4, Sep. 1978, pp. 1671-1672.

"Keyboard Redefinition", B. Zbrozek, IBM Technical Disclosure Bulletin, vol. 22, No. 5, Oct. 1979, pp. 1957-1958.

"Flexible Keyboards", W. A. Freeman et al., IBM Technical Disclosure Bulletin, vol. 22, No. 10, Mar. 1980, pp. 4343-4344.

"Electronically Changeable Keyboard Key Inscriptions", S. P. Ghosh, IBM Technical Disclosure Bulletin, vol. 23, No. 3, Aug. 1980, pp. 1190-1193.

"Table Selection of Key Type, Data and Scan Order", J. P. Dahl et al., IBM Technical Disclosure Bulletin, vol. 23, No. 7A, Dec. 1980, pp. 2937-2939.

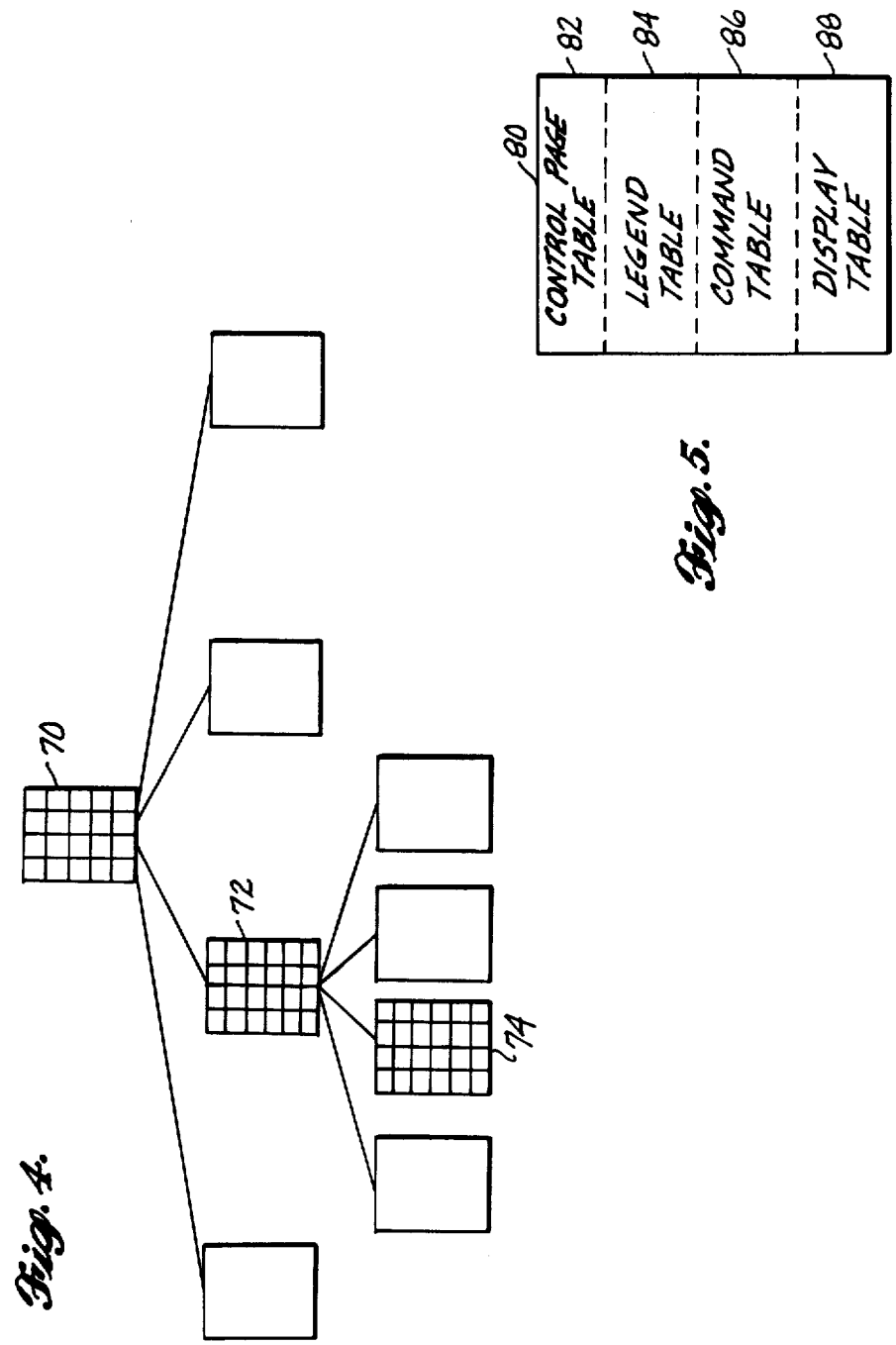

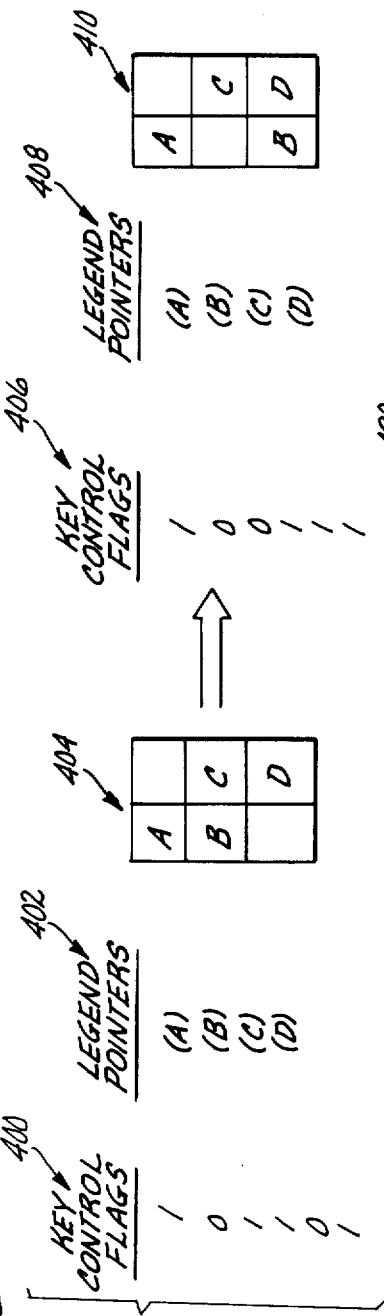
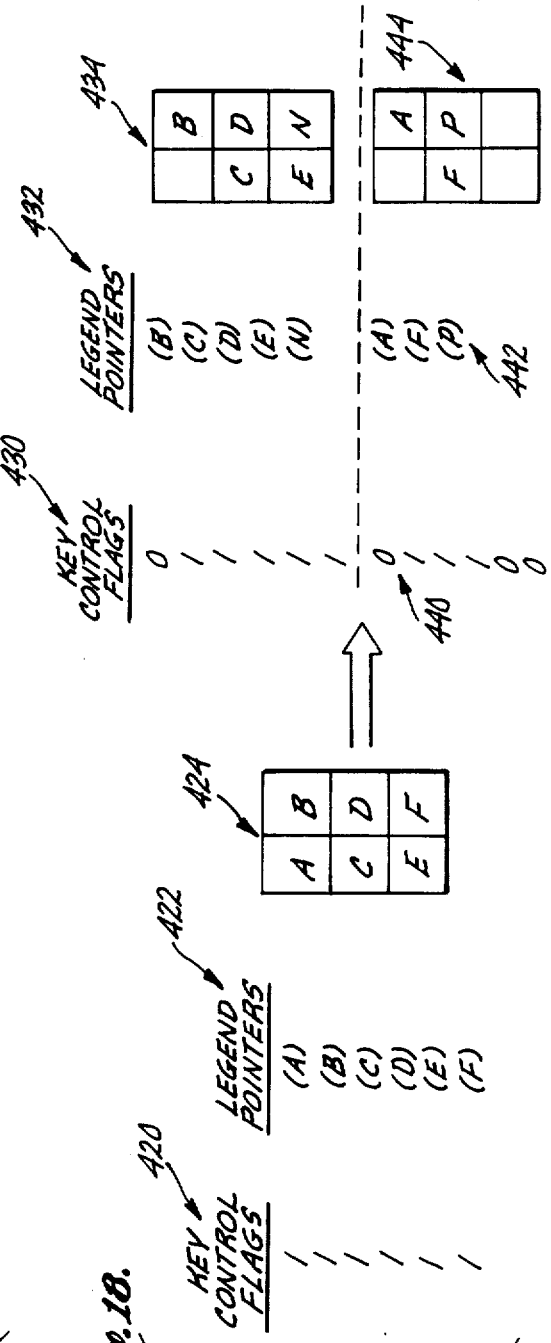

PROGRAMMABLE MULTIFUNCTION KEYBOARD

FIELD OF THE INVENTION

The present invention relates to programmable multifunction keyboards.

BACKGROUND OF THE INVENTION

The increasing complexity of aircraft avionics, navigation and weapons systems has resulted in a proliferation of keys, switches and controls within a limited cockpit area. Reduction in the number of keys would simplify equipment configurations and reduce crew workload. One known method of reducing the number of keys is to provide a multifunction keyboard comprising keys that are capable of performing different functions at different times. "Key" is here used in the broad sense to include any manually operated signalling means. A number of simple, multifunction keyboard applications are in widespread use. The handheld calculator is an example wherein many keys perform two functions based upon the activation of a dedicated "second function" key, the corresponding second function usually being printed under each key. Another technique uses multiple back-lit films to display up to twelve selectable legends on one key. Systems of this type are clearly limited by the number of fixed legends available.

To overcome the limitation of fixed legends, programmable multifunction keyboards have been developed. One example of a prior programmable multifunction keyboard is a system that displays, on a small CRT, the legends associated with bezel mounted switches on the CRT perimeter. Such systems achieve a significant level of versatility and adaptability be enabling the legends and functions associated with each switch to be modified both before the system is installed and during operation of the system. Prior programmable multifunction key systems have not, however, achieved the full potential inherent in such systems. Design of a programmable multifunction keyboard system involves the creation of a complex "logic network" that specifies the interrelationship between different sets of key configurations. For example, a control system may be initialized to a key configuration in which each key specifies a general subsystem that the operator may wish to select. Activation of a key corresponding to a particular subsystem may then produce a key configuration corresponding to possible operations within that subsystem. Activation of the key for a particular operation may then produce a configuration corresponding to available suboperations, etc. As more operations are performed with a given small number of programmable keys, the complexity of the logic network grows rapidly. Therefore one important attribute of a multifunction keyboard system is the comparative difficulty of designing and of modifying the design of the system, and in particular the logic network, to optimize system performance. Unfortunately, the design of prior programmable multifunction keyboards has not provided easy-to-modify systems, and the usefulness of such prior keyboard systems has therefore been limited.

A second important attribute of programmable multifunction keyboard systems is the extent to which such systems include features that reduce operator error. For example in cockpit applications, it would be very desirable to adjust the intensity of the key legend display to provide good visibility under all conditions. It would further be desirable to provide means, such as blinking, to highlight certain switches under certain conditions. Finally, it would be desirable to provide a programmable multifunction keyboard system that is capable of monitoring the keys for malfunction, and of automatically reconfiguring itself when a defective key is detected.

SUMMARY OF THE INVENTION

The present invention provides a programmable multifunction keyboard system in which the key configurations and the relationships between key configurations are fully specified by a data base that may be readily edited to create different systems and to optimize the performance of a particular system.

In one preferred embodiment, the present invention comprises keyboard means having a plurality of switches and display means for displaying a legend visually associated with each switch, and actuation control means for monitoring the switches and providing an actuation signal identifying an actuated switch. The multifunction keyboard system further comprises processor means that includes means for storing a data base. The data base comprises a plurality of control pages, each control page including legend data and next page data. The legend data specifies a legend for display in association with at least one of the switches and the next page data specifies a next control page associated with at least one of the switches. The processor means further comprises means for designating one of the control pages as the active control page, and means responsive to the actuation of a selected switch to designate the control page specified by the next page data of the current active control page corresponding to the selected switch as the new active control page. Finally, the multifunction keyboard system comprises means for causing the display means to display the legends specified by the legend data of the active control page.

In a further aspect, the present invention comprises a luminance circuit that is operative to provide a luminance sensor signal indicative of the luminance level in the environment of the keyboard means. The processor means responds to the luminance sensor signal by producing a display level signal that corresponds to an appropriate display intensity for the keyboard means at that luminance level. The means for causing the display means to display the legends includes means for adjusting the intensity of the display legends in response to the display level signal. The luminance circuit may comprise a plurality of luminance sensors each of which produces a separate luminance sensor signal, and the processor means may include means for combining the luminance sensor signals into a composite luminance signal for producing the display level signal.

In a further aspect of the present invention, the legend data comprises blink data that indicates whether a legend is to blink when displayed. The means for causing the display means to display the legends comprises blink control means responsive to the blink data for causing the corresponding legends to blink when displayed. The blink control means may comprise means for storing the blink data corresponding to the active control page, a blink clock for generating a periodic blink clock signal having a period corresponding to the desired blinking rate, and blink logic means for combining the blink data with the legend data such that legends that are to blink when displayed are blanked at a rate corresponding to the blink clock signal.

In a further aspect, the actuation means comprises means for detecting a switch that may be inoperative and for producing a corresponding indication that identifies tthe inoperative switch. The processor means includes reconfiguration means for reconfiguring each active control page such that legend data and next page data is not associated with a switch identified as inoperative. The reconfiguration means may comprise means for creating a new control page when there are an insufficient number of operable switches for the active control page.

BRIEF DESCRIPTION OF THE DRAWINGS

FIG. 4 is a schematic view showing the relationships between different keyboard configurations.

FIG. 5 is a diagram of the keyboard configuration data base.

FIG. 17 is a diagram illustrating a reconfiguration of the active control page.

FIG. 18 is a diagram illustrating a second reconfiguration of the active control page into two control pages.

DETAILED DESCRIPTION OF THE INVENTION

Figure 1:
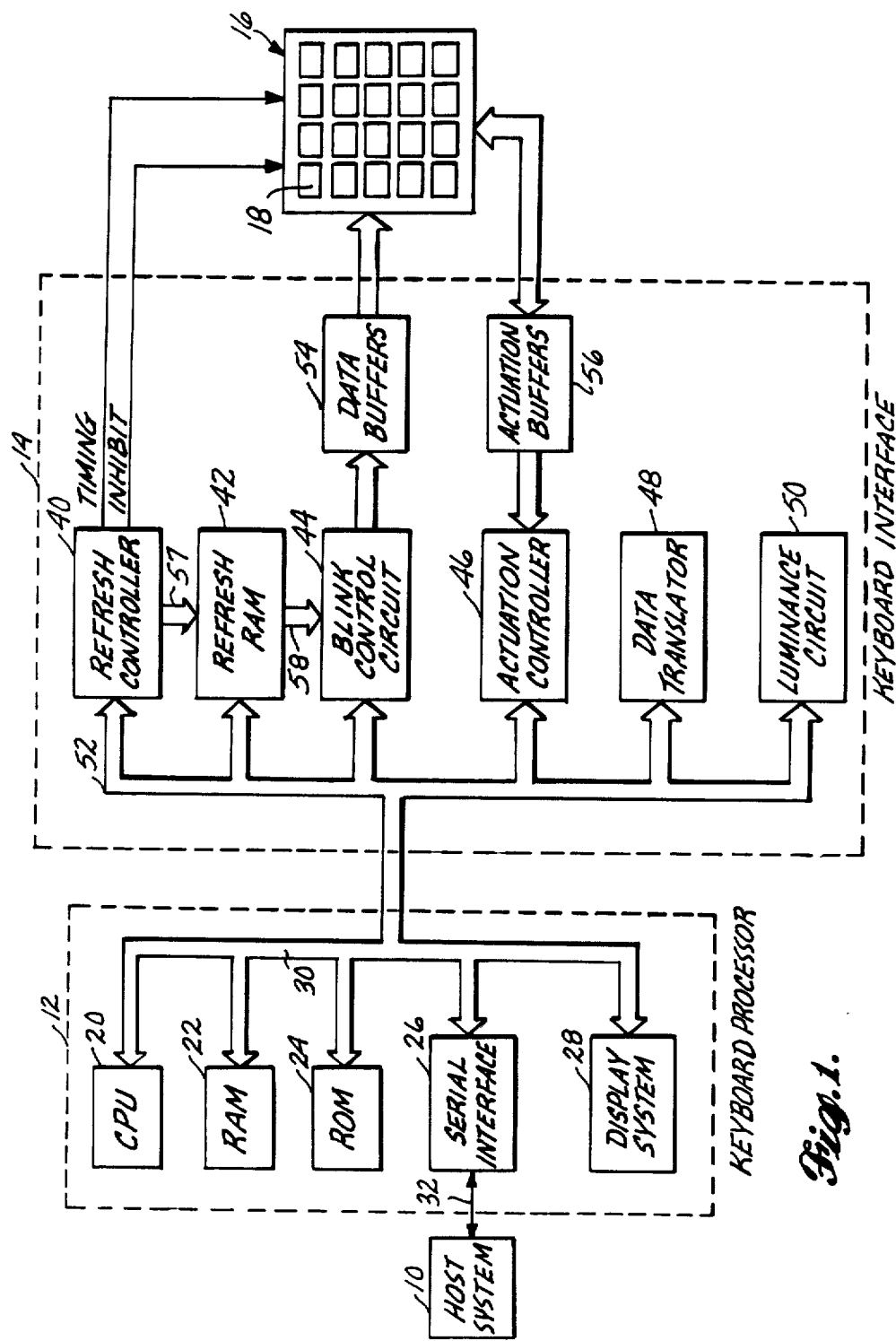
FIG. 1 is a block diagram of the multifunction keyboard system of the present invention.

FIG. 1 sets forth a block diagram of a programmable, multifunction keyboard system according to the present invention. The system comprises host system 10, keyboard processor 12, keyboard interface 14, and keyboard 16. The keyboard comprises a plurality of programmable multifunction keys 18, each key comprising means for displaying a "legend" or label that indicates the function of the key at any given time, and a switch that can be actuated by a operator. Host system 10 represents any digital system, and typically comprises a computer system that functions to control the overall operation of an aircraft, spacecraft or other complex device.

Keyboard processor 12 comprises CPU 20, RAM 22, ROM 24, serial interface 26 and display system 28, the different units of keyboard processor 20communicating with one another via processor bus 30. CPU 20 preferably comprises a microprocessor, the particular microprocessor selected being dependent upon the number of keys 18 included in keyboard 16, the required response time of the system, and other factors that will become apparent below. For the particular preferred embodiment described herein, a Z8001 microprocessor available from Zilog is suitable. RAM 22 is a conventional random access memory whose principal function is the storage of a data base specifying the keyboard configurations. ROM 24 is a conventional read only memory that stores the program for operating CPU 20. Data is sent between host system 10 and keyboard processor 12 via serial interface 26 and serial communication line 32. Display system 28 comprises a conventional display system for presenting information and instructions to an operator of the system, and particularly to an operator of keyboard 16. Suitable display systems include thin film electroluminescent (TFEL) systems and CRT systems.

Keyboard processor 12 sends legend data to keyboard interface 14 indicating the functions assigned to keys 18, and the keyboard interface causes the legend data to be displayed on the appropriate keys. The keyboard interface also monitors the switches of keys 18, and signals the keyboard processor when the switch of a particular key has been actuated. The operation of the keyboard interface is described in detail below.

Figure 2:
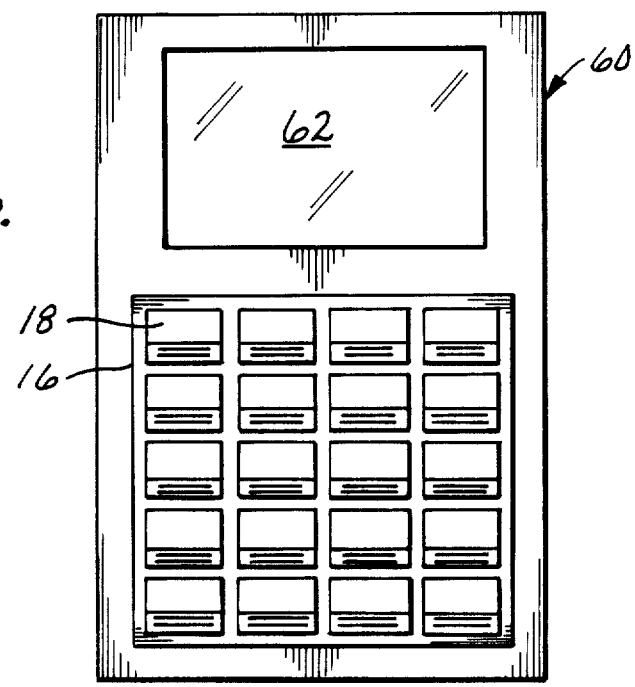
FIG. 2 is a front elevational view of the display system screen and keyboard.
Figure 3:
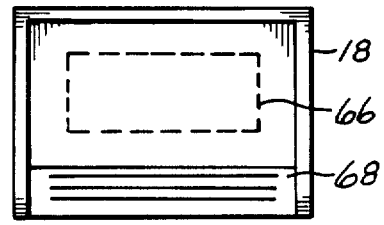
FIG. 3 is a front elevational view of a key.

Referring now to FIG. 2, in one preferred embodiment, a single housing 60 may be used to mount keyboard 16 and a display screen 62 associated with display system 28. Keyboard 16 comprises an array of individual keys 18, one such key being shown in FIG. 3. Each key 18 includes a rectangular array 66 of LEDs and a switch that comprises a touch sensitive actuation bar 68. In one preferred embodiment, array 66 comprises 560 LEDs arranged in 16 rows of 35 LEDs per row. Such an array is capable of displaying up to two rows of six alphanumeric characters per row, as well as graphics symbols. The term "legend" will be used herein to designate the characters, symbols or other information displayed on a key by illuminating particular combinations of LEDs. The legend displayed on a key at any given time indicates the function (if any) that the key has at that time. A suitable key 18 for use in the keyboard system of the present invention is the Programmable Display Pushbutton key, Model PDP-ML6G-BBH available from Microswitch.

A representative mode of operation of the multifunction keyboard system is illustrated schematically in FIG. 4. Block 70 represents the configuration of keyboard 16 when the keyboard processor is reset or initialized, either through its internal operation or upon receipt of an appropriate command from host system 10. In such an initialized state, the legends displayed by the LED arrays of the keys could, for example, indicate different systems or functions that may be inspected and/or controlled by the operator. For purposes of illustration, assume that host system 10 represents an aircraft control system, and that one of the keys in configuration 70 displays the legend NAV as an abbreviation for the navigation system. Pressing actuation bar 68 of that key would cause the system to respond by changing keyboard 16 to configuration 72, in which the legends displayed by the keys would correspond to the several navigation subsystems included in the aircraft. Actuating a particular key in configuration 72 could then lead to configuration 74 in which the key legends display, for example, the different operating frequencies available within the selected navigation subsystem. Actuating a key corresponding to a particular frequency would then operate to select that frequency for use by that subsystem. The pilot could then actuate a second key within configuration 74 to return the system to configuration 72, at which time other parameters of the chosen navigation subsystem could be specified. It is evident from this brief example that the particular keyboard configurations, and the interrelationships between keyboard configurations, depend upon the nature of the system in which the keyboard is included. It is one of the most important characteristics of the present invention that the keyboard configurations and their interrelationships are fully specified and determined by a data base. The data base may be created and modified by the host system and then downloaded to keyboard processor 12 and stored in RAM 22. The keyboard system of the present invention is also adapted to operate in an environment in which there is no host system, and in which the data base is created, modified and stored entirely within keyboard processor 12. In either embodiment, modification of the key configurations and their interrelationships can be accomplished simply by editing the data base.

Figure 6:
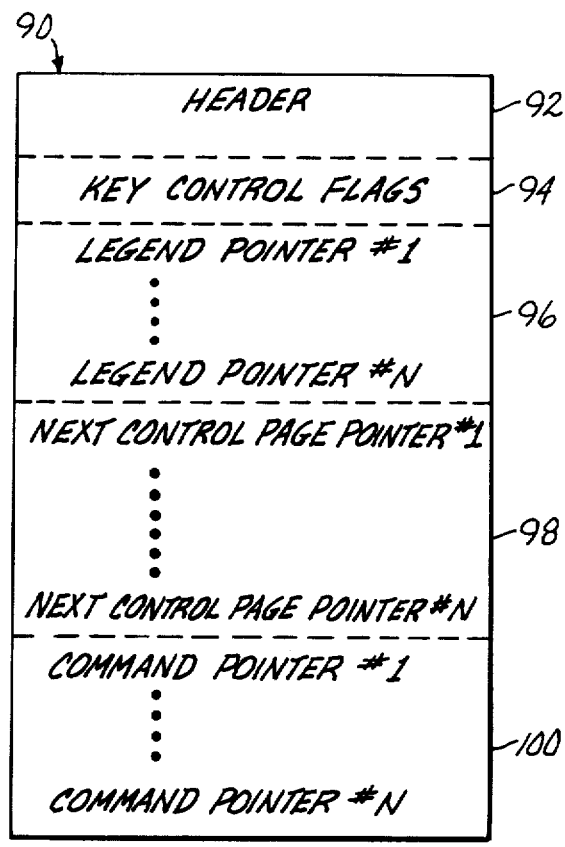
FIG. 6 is a diagram illustrating one control page of the data base of FIG. 5.

One preferred embodiment of the keyboard configuration data base is illustrated in FIGS. 5 and 6. FIG. 5 shows data base 80 comprising control page table 82, legend table 84, command table 86 and display table 88. Legend table 84 comprises a plurality of legend records, each legend record comprising the "pixel map" for a single key, one bit of the data of the legend record being mapped to one LED of array 66. Command table 86 comprises a plurality of command records, and display table 88 comprises a plurality of display records. The command and display records are described in greater detail below.

Control page table 82 comprises a plurality of control pages. At any given time, keyboard processor 12 regards one control page as the "active" control page. Each control page corresponds to a state of the multifunction keyboard system. In particular, each control page, when it is the active control page, specifies the legends displayed by each key, the information to be displayed by display system 28, the commands that will be executed when each key is actuated, and the control page that will become the active control page when each key is actuated. FIG. 6 illustrates a single control page 90 of control page table 82. Control page 90 comprises header 92, key control flags 94, legend pointers 96, next control page pointers 98 and command pointers 100. Header 92 may include control information together with information specifying the characteristics of display system 28, the location of display table 88, and the location within display table 88 of the display data associated with the particular control page. Key control flags 94 provide condensed information concerning which keys are active for this control page, i.e., which keys have legends and functions associated with them. Legend pointers 96 contain pointers to (i.e., addresses of) individual legend records in legend table 84, legend pointer N pointing to the legend record that will be displayed on the Nth active key when control page 90 is active. Next control page pointers 98 specify the control pages that will become active upon actuating an active key, next control page pointer N pointing to the control page that will become active when the Nth active key is actuated when control page 90 is active. Command pointers 100 contain pointers to the commands (if any) that will be executed upon actuating a key, command pointer N pointing to the command of command table 86 that will be executed when the Nth active key is actuated when control page 90 is active. It is apparent that the data contained in data base 80 fully specifies the configurations of keyboard 16, and the relationships between such configurations.

Referring again to FIG. 1, the function of keyboard interface 14 is to cause legends to be displayed on keyboard 16, and to signal keyboard processor 12 when a particular key has been actuated. The keyboard interface comprises refresh controller 40, refresh RAM 42, blink control circuit 44, actuation controller 46, data translator 48 and luminance circuit 50, these components being interfaced to one another and to keyboard processor 12 by bus 52. The refresh controller is linked to the refresh RAM by address bus 57, and the refresh RAM is linked to the blink control circuit by data bus 58. Keyboard interface 14 further comprises data buffers 54 and actuation buffers 56 that interface directly with keyboard 16.

Figure 7:
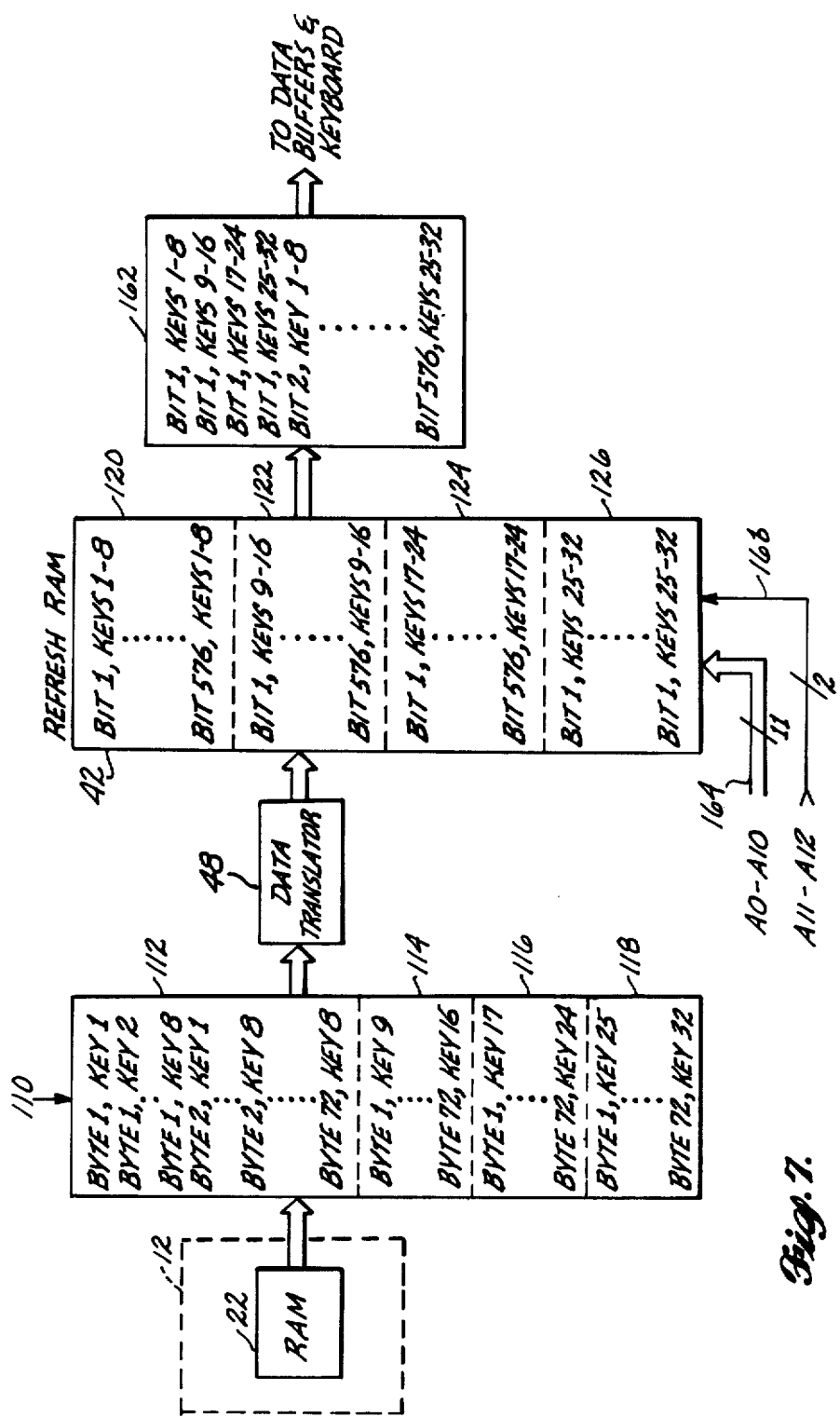
FIG. 7 is a diagram illustrating the transfer of legend data from the keyboard processor to the keyboard.

When a new control page becomes the active control page, keyboard processor 12 identifies the legend records that are to be displayed by keys 18 of keyboard 16 while that control page remains active. The keyboard processor than assembles the identified legend records and sends them to refresh RAM 42 for display on the respective keys. The technique by which the legend records are transferred from the keyboard processor to the refresh RAM, and ultimately to the keys, is illustrated in FIG. 7. For the purpose of illustrating one particular embodiment, it will be assumed that keyboard 16 comprises 32 keys. Because the legend records are rearranged in the course of their transfer from the keyboard processor to the keyboard, the term "legend data" will hereafter be used to collectively refer to the data comprising the 32 legend records that are to be displayed while a given control page is active. The legend data is initially transferred from RAM 22 of keyboard processor 12 to data translator 48 of keyboard interface 14. It will be assumed that each legend record transferred to the refresh RAM comprises 560 bits (corresponding to 16 rows of 35 pixels), plus 16 "start of row" bits, for a total of 576 bits or 72 bytes per legend record. The start of row bits are discussed below. The order in which the legend data is sent from RAM 22 to data translator 48 is indicated by table 110 of FIG. 7. The legend data is not transferred on legend record at a time. Instead, the legend records corresponding to each group of eight keys are transferred as block. Block 112 (keys 1–8) is transferred first, followed by block 114 (keys 9–16), block 116 (keys 17–24) and finally block 118 (keys 25–32). Within each block, the legend data is transferred in byte sequence. For example for block 112, the first bytes of the legend records for keys 1 through 8 are transferred first, followed by the second bytes for keys 1 through 8, etc. Data translator 48 receives the legend data in eight byte units, each unit comprising a particular byte from a particular eight key block. The data translator rearranges each eight byte unit, and stores the rearranged data in refresh RAM 42, the rearranged data sequence being indicated within refresh RAM block 42 of FIG. 7. The first eight byte unit received by data translator 48 comprises byte 1 for keys 1–8. When rearranged by the data translator and stored in the refresh RAM, the first byte of legend data comprises bit 1 of keys 1–8, the second byte comprises bit 2 of keys 1–8, etc. The data translator, however, does not change the overall block structure of the legend data. As a result, the data in refresh RAM 42 still comprises four blocks: block 120 corresponding to keys 1–8, block 122 corresponding to keys 9–16, block 124 corresponding to keys 17–24, and block 126 corresponding to keys 25–32. Each block of data in the refresh RAM is aligned on a 2048 byte boundary, i.e., block 120 begins at address 0, block 122 begins at address 2048, block 124 begins at address 4096, and block 126 begins at address 6144. The purpose of such alignment is described below.

Figure 8:
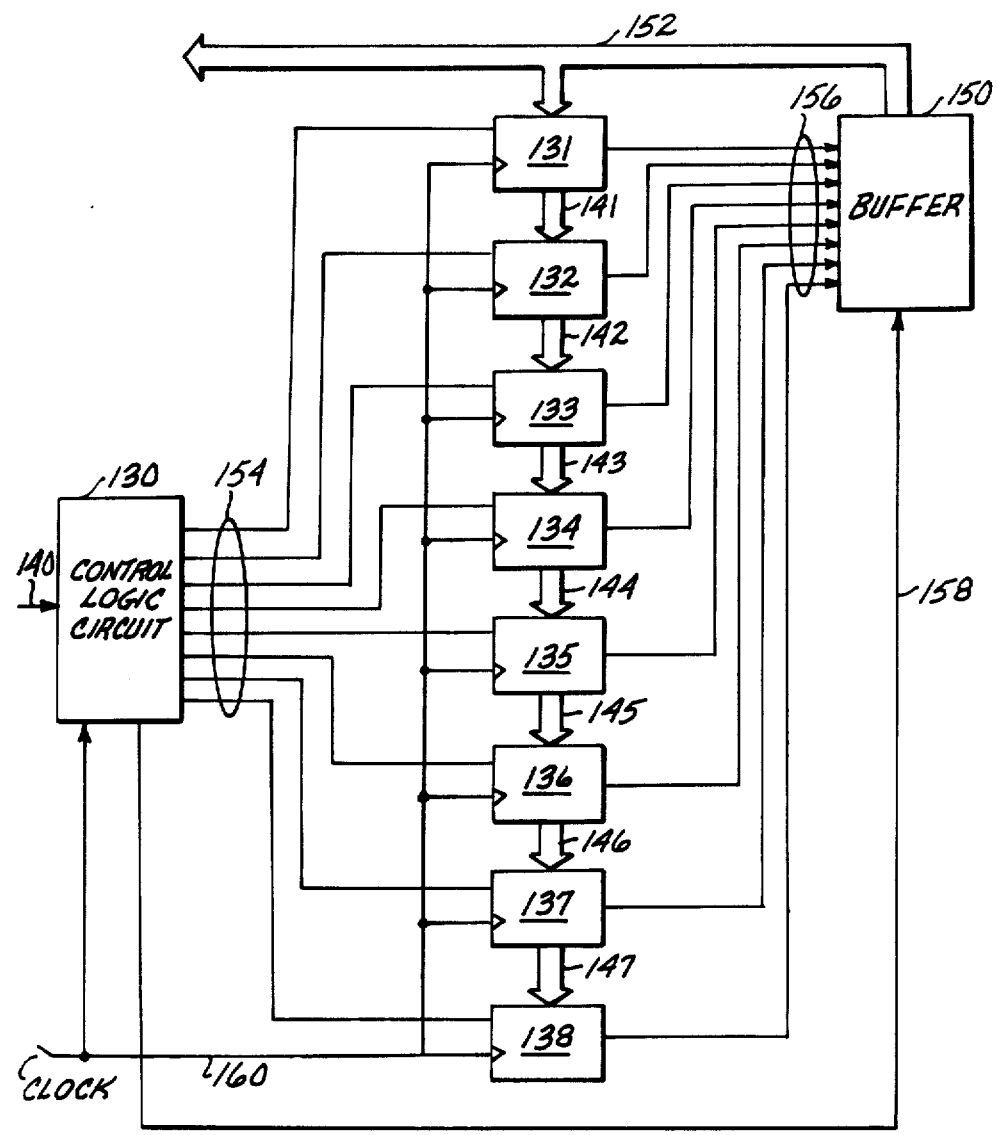
FIG. 8 is a circuit diagram of the data translator.

A preferred embodiment of data translator 48 is illustrated in greater detail in FIG. 8. The data translator comprises control logic circuit 130, shift registers 131–138, and buffer 150. Data from keyboard processor 12 enters the data translator via bus 152, bus 152 being interfaced to (or an extension of) the data portion of bus 52. In response to translate control signals from the keyboard processor on lines 140, control logic circuit 130 issues a series of signals on control lines 154 that causes the data translator to operate in alternating Read and Write cycles. During a Read cycle, the control logic circuit causes shift registers 131–138 to sequentially load eight bytes of data from bus 152, one byte per shift register, 8 bit data buses 141–147 being used to load a particular shift regfister from bus 152 through intervening shift registers. The control logic circuit then initiates a Write cycle in which it causes shift registers 131–138 to simultaneously output their data, one bit at a time, through lines 156 into 8-bit buffer 150. After each shift, buffer 150 transfers its 8-bit (one byte) contents to bus 152 in response to a buffer control signal on line 158. The rate at which shift registers 131–138 serially output data is controlled by a clock signal on line 160, the clock signal also being input to control logic circuit 130. After each shift register has shifted out eight bits of data onto output lines 156, control logic circuit 130 terminates the Write cycle and commences the next Read cycle.

Referring again to FIG. 7, table 162 indicates the order in which legend data is transferred from refresh RAM 42 to data buffers 54 and to keyboard 16. As indicated, the first byte of data transferred consists of the first byte of block 120, i.e., the data corresponding to bit 1 of keys 1–8. The next byte transferred is the first byte of block 122, i.e., the data corresponding to bit 1 of keys 9–16. The first bytes of blocks 124 and 126 are then tranferred, followed by the second byte of block 120, etc. The transfer of data from the refresh RAM is controlled by a refresh RAM address that comprises an 11-bit address A0–A10 on line 164 and a 2-bit address A11–A12 on line 166. Address A11–A12 comprises the high order two bits of the refresh RAM address, and specifies the 2048 byte block from which the data is transferred. Address A0–A10 comprises the low order portion of the refresh RAM address, and specifies the particular address within a block. Both addresses are generated by refresh controller 40, as described below.

Figure 9:
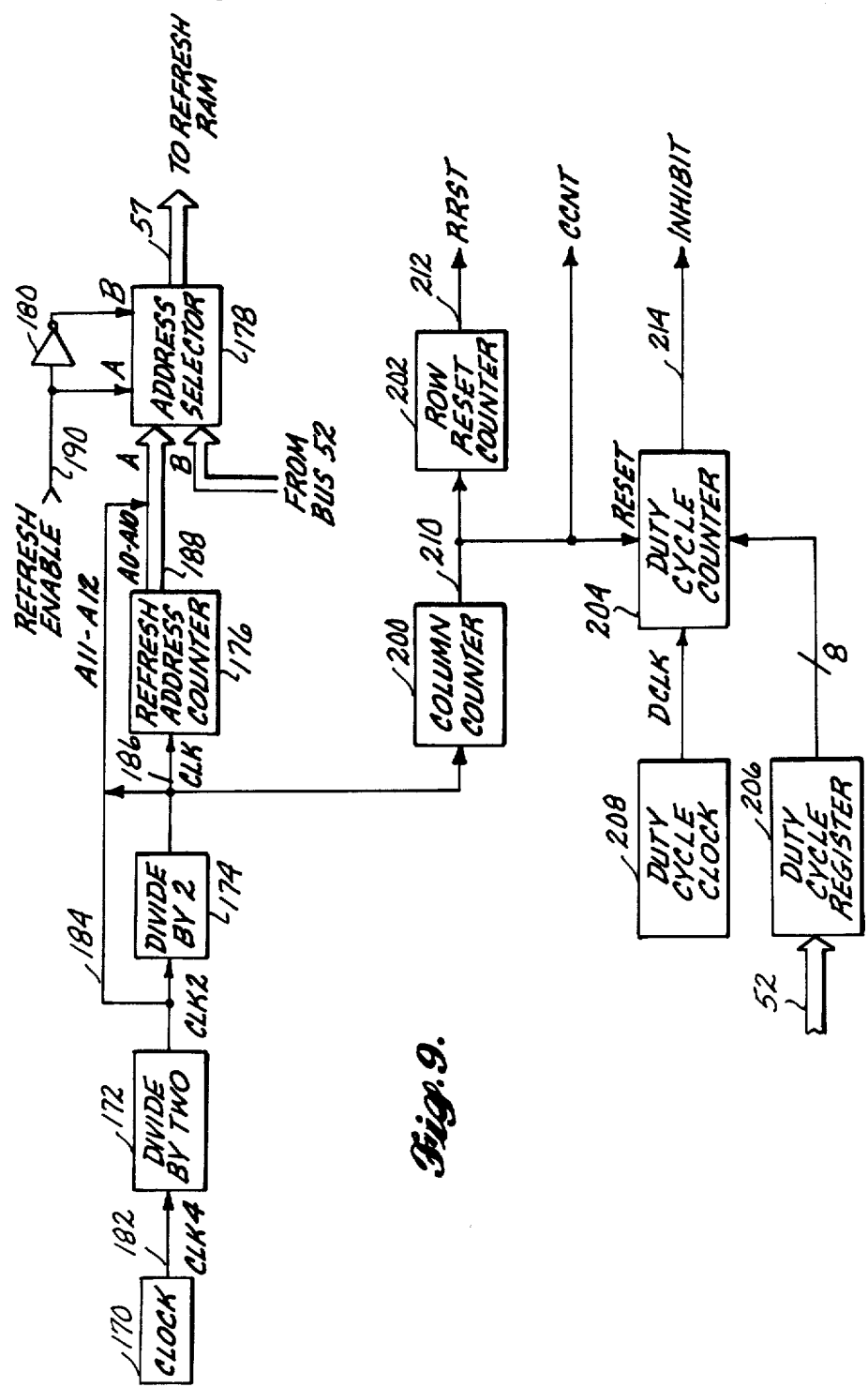
FIG. 9 is a circuit diagram of the refresh controller.
Figure 10:
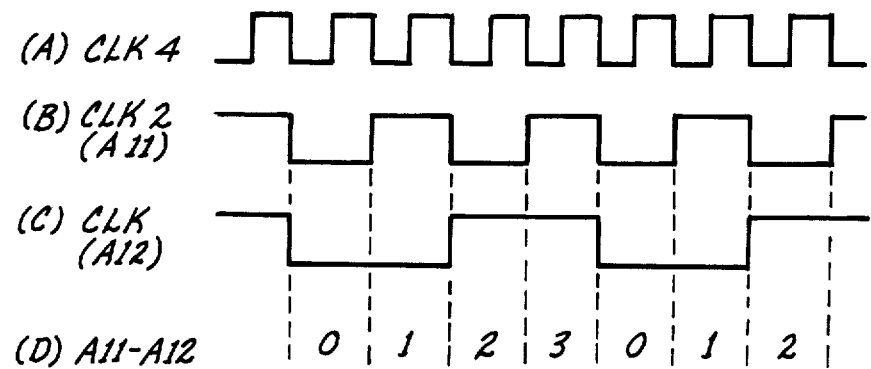
FIG. 10 is a timing and signal diagram for the signals produced by the refresh controller.

Referring to FIG. 9, refresh controller 40 comprises clock 170, divide-by-two circuits 172 and 174, refresh address counter 176, address selector 178 and inverter 180. The remaining refresh controller components are described below. Clock 170 generates a comparatively high frequency CLK4 signal on line 182, the CLK4 signal being illustrated in FIG. 10A. The CLK4 signal is input to divide-by-two circuit 172, and the divide-by-two circuit produces signal CLK2 on line 184, the CLK2 signal having a frequency half that of the CLK4 signal (FIG. 10B). Divide-by-two circuit 174 halves the frequency of the CLK2 signal to produce the CLK signal on line 186 (FIG. 10C). As indicated in FIGS. 9 and 10, the A11 and A12 signals are derived directly from the CLK2 and CLK signals, respectively. Therefore, as indicated in FIG. 10D, the value of the high order address portion specified by address A11–A12 cyclically takes on values 0, 1, 2 and 3, during each full cycle of the CLK signal.

Refresh address counter 176 counts the cycles of the CLK signal, the accumulated count comprising the low order portion (A0–A10) of the refresh RAM address. Such low order address portion is output by the refresh address counter on bus 188, where it is merged with the high order address A11–A12 and connected to the A input port of address selector 178. The B input port of address selector 178 comprises the address portion of bus 52. During the transfer of data from keyboard processor 12 to the refresh RAM, the keyboard processor pulls line 190 low. The low signal on line 190 causes inverter 180 to produce a high signal at selection terminal B of address selector 178, causing the address selector to select input port B. As a result, refresh RAM addresses appearing on bus 52 are selected by address selector 178 and appear on address bus 57. The keyboard processor can therefore control the sequence in which data is stored in the refresh RAM to correspond to the data sequence indicated in block 42 of FIG. 7.

When keyboard processor 12 has finished writing data to refresh RAM 42, it generates a high signal on line 190. Address selector 178 responds by selecting the addresses appearing at input port A. As described above, the addresses at input port A comprise a low order address (A0–A10) from refresh address counter 176, and a high order address A11–A12. At the completion of each cycle of the CLK signal, refresh address counter 176 increments its count by 1, thereby incrementing the low order address A0–A10 by 1. Each value of address A0–A10 will therefore remain constant while the high order address A11–A12 cycles through four values, such values corresponding to blocks 120, 122, 124 and 126 of FIG. 7. As a result, data will be transferred from the refresh RAM to the keyboard in the sequence indicated in table 162 of FIG. 7. The data transfer sequence of table 162 will continue to repeat until the keyboard processor again pulls line 190 low.

Figure 11:
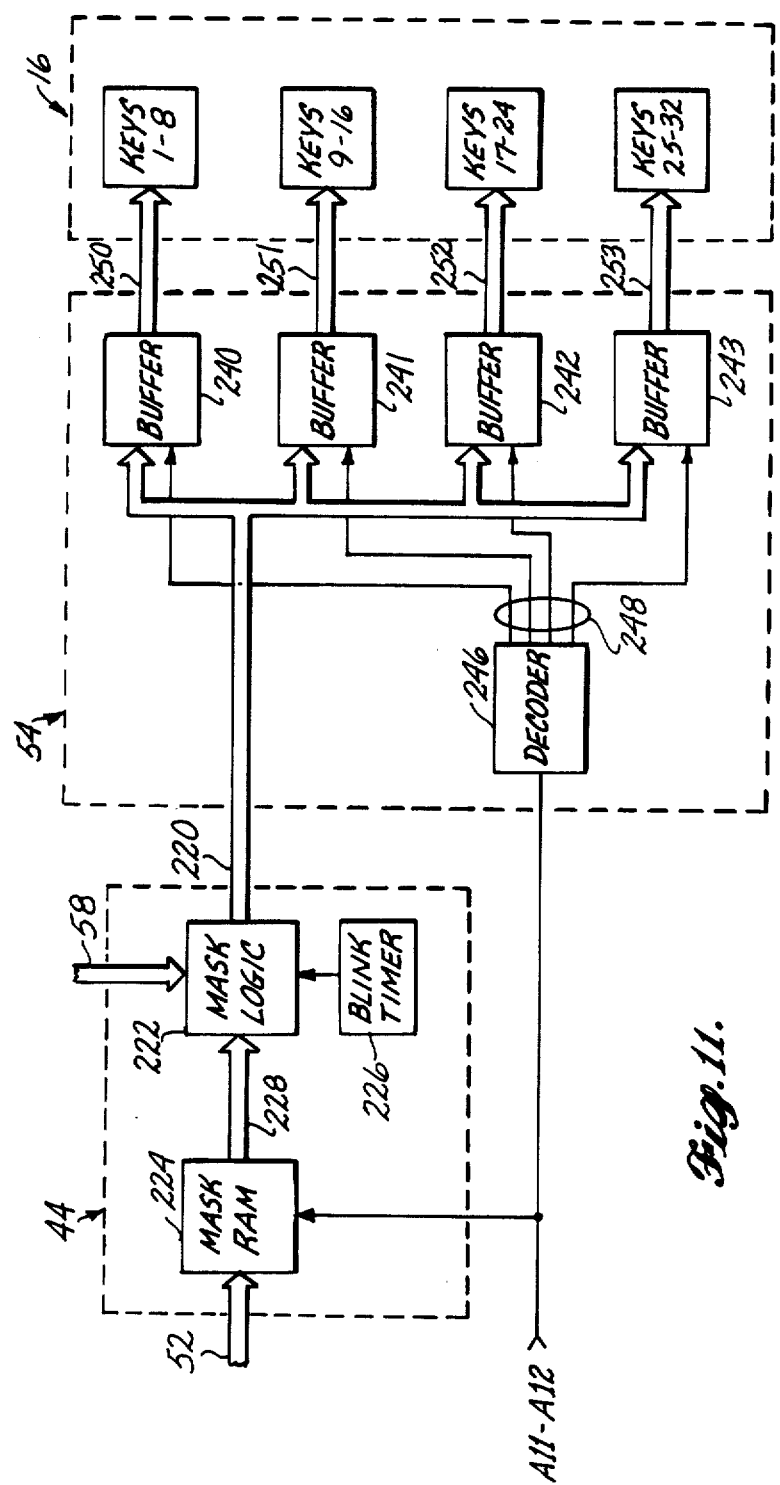
FIG. 11 is a block diagram of the blink control circuit and data buffers.

Referring now to FIG. 11, data output by refresh RAM 42 in response to the address on address bus 57 is sent to blink control circuit 44 over data bus 58. The blink control circuit comprises mask logic 222, mask RAM 224, and blink timer 226. In a preferred embodiment, each legend record of legend table 84 includes a flag that indicates whether that legend is to blink when displayed by one of the keys of keyboard 16. Whenever a new control page becomes the active control page, keyboard processor 12 assembles the flags comprising the blink information for the legend records corresponding to that control page, and writes the resulting blink data into mask RAM 224 through bus 52. Mask RAM 224 comprises four blink bytes that correspond to the four key groups (keys 1–8, keys 9–16, keys 17–24, and keys 25–32). In response to address signal A1-1–A12, mask RAM 224 outputs one of such blink bytes on 8-bit bus 228. At any given time, the particular blink byte output by the mask RAM corresponds to the refresh RAM block (FIG. 7) from which the refresh RAM data on bus 58 is produced.

Figure 12:
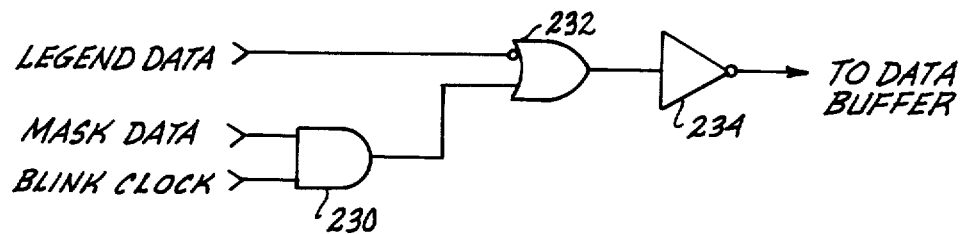
FIG. 12 is a circuit diagram of one mask circuit of the mask logic circuit.

Mask logic 222 combines the blink data received from mask RAM 224 over bus 228 with the legend data received from refresh RAM 42 over bus 58 in such a way so as to cause the appropriate keys to blink. Mask logic 222 preferably comprises eight identical mask circuits, each mask circuit being operative to combine blink data on one line of bus 228 with legend data on one line of bus 58, to produce blink-modified legend data on one line on bus 220. A preferred mask circuit is shown in FIG. 12. The mask circuit of FIG. 12 comprises AND gate 230, OR gate 232 and inverter 234. The two inputs to AND gate 230 are mask data from one line of bus 228 and a periodic blink clock signal from blink timer 226. The period of the blink clock signal is selected to correspond to the desired blinking rate. The output of AND gate 230 forms one of the inputs to OR gate 232, the other input being legend data from one line of bus 58 from refresh RAM 42, the legend data input being inverted prior to being acted upon by OR gate 232. The output of OR gate 232 is inverted by inverter 234, the output of inverter 234 forming one line of bus 220 that connects the blink control circuit to the data buffers. When the mask data from the mask RAM is low, indicating that blinking should not occur, the output of AND gate 230 is low and, as a result, the legend data from the refresh RAM is transferred without modification to the data buffers. When the mask data from the mask RAM is high, the blink clock signal will pass through AND gate 230 to OR gate 232. As a result, the legend data sent to the data buffers will be forced low at a rate corresponding to the blink clock signal.

Still referring to FIG. 11, data buffers 54 comprise 8 bit buffers 240-243 and decoder 246. In response to address A11-A12, decoder 246 issues a series of buffer select signals on lines 248 that cyclically select one of bufffers 240-243 to receive a byte of legend data from bus 220. Referring again to table 162 of FIG. 7, decoder 246 causes the first byte (bit 1, keys 1-8), to be received in buffer 240, the second byte to be received in buffer 241, etc. Therefore, each buffer receives legend data corresponding to a particular group of eight keys. The legend data in each buffer 240-243 is transferred to its corresponding keys by 8 bit buses 250-253.

Figure 13:
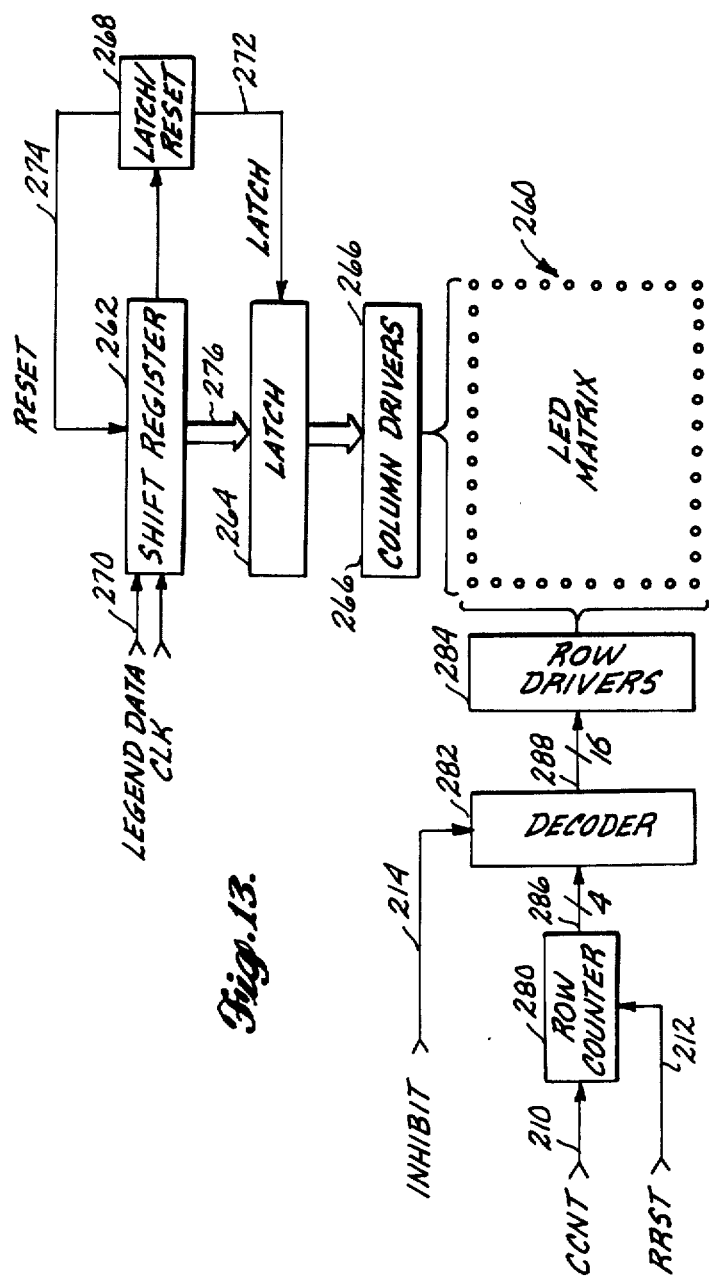
FIG. 13 is a circuit diagram of the row and column drivers associated with one key.

FIG. 13 sets forth the circuitry associated with each key 18 of keyboard 16. The key circuitry comprises LED matrix 260 and associated column and row drive circuits. As previously described, LED matrix 260 comprises a rectangular array of 16 rows of 35 LEDs per row. A particular LED will be illuminated when its particular row and column are both energized by the row and column driving circuits, respectively. The column drive circuit comprises shift register 262, latch 264, column drivers 66 and latch/reset circuit 268. The legend data to be displayed on the key is received in serial form by shift register 262 over line 270, line 270 comprising one line of one of buses 250-253 (FIG. 11). Such data is clocked into shift register 262 at a rate determined by the CLK signal (FIG. 10C) provided by refresh controller 40.

During the time that a given legend is being displayed on the key, the legend data is received over line 270 as a series of identical 576 bit "frames," each frame containing the pixel pattern for the legend that is to be displayed by LED matrix 260. The set of frames for all 32 keys corresponds to one repetition of the data transfer sequence of table 162 (FIG. 7). The first bit of each frame is a "1" start of row bit. The first start of row bit is then followed by 35 data bits corresponding to the first row of LEDs or pixels in LED matrix 260. A second "1" start of row bit is then received, followed by 35 data bits for row 2, etc. Shift register 262 is 36 bits wide. When the 36th bit of the shift register becomes a "1", i.e., when the shift register has received a start of row bit plus the 35 data bits for that row, latch/reset circuit 268 responds by generating a latch signal on line 272 that causes 35 bit latch 262 to latch the leftmost 35 bits of shift register 262 via 35 bit bus 276. After a brief delay to enable the latching to complete, latch/reset circuit 268 issues a reset signal on line 274 that clears shift register 262 to zeros. By such means, the latching and reset operations are controlled by the start of row bit packed with the legend data, rather than by separate control signals. The contents of latch 264 drive the columns of LED matrix 260 via column drivers 266, such that each column of the LED matrix will be energized if the corresponding latch bit is a "1".

The rows of LED matrix 266 are driven by a row driving circuit that comprises row counter 280, decoder 282 and row drivers 284. Row counter 280 cyclically counts from 1 to 16 by counting cycles of a CCNT signal generated by the refresh controller. The count contained in a row counter 280 at any given time specifies the row of LED matrix 260 that will be energized at that time. Referring to FIG. 9, the refresh controller includes column counter 200, row reset counter 202, duty cycle counter 204, duty cycle register 206, and duty cycle clock 208. Column counter 200 counts cycles of the CLK signal on line 186, and generates an output pulse on line 210 every 36 cycles of the CLK signal. Such pulses comprise the CCNT signal, and are received by row counter 280, each CCNT pulse causing row counter 280 to increment its count by 1. The operation of column counter 200 is controlled such that row counter 280 increments its count at the same time that a new row of data is latched into latch 264. A four-bit binary row number signal representing the accumulated count in row counter 280 is sent via data path 286 to decoder 282. Decoder 282 decodes the 4 bit row number signal and activates one of 16 control lines 288, causing one row of LED matrix 260 to be energized by row drivers 284. Thus a pixel at row i and column j of LED matrix 260 will be illuminated when the count accumulated by row counter 280 is i and when bit j of latch 264 is a one.

Referring again to FIG. 9, row reset counter 202 counts the cycles of the CCNT signal, and generates a reset pulse every 16 cycles of the CCNT signal, the reset pulses comprising the RRST signal. The RRST signal is sent via line 212 to the reset terminal of row counter 280, resetting the row counter at the end of each 576 bit frame in preparation for the following frame.

The brightness of the legend displayed on LED matrix 260 is controlled by an inhibit signal generated by duty cycle counter 204. During a given frame of data received on line 270, row counter 280 holds a particular row number for one "row interval," i.e., for the 36 CLK cycle interval between CCNT pulses. The inhibit signal on line 214 controls the fraction of each row interval in which the corresponding row of LED matrix 260 is energized via decoder 282 and row drivers 284. Referring to FIG. 9, keyboard processor 12 writes a display level value into duty cycle register 206 via bus 52, the display level value corresponding to the desired display intensity for the keys. At the beginning of each row interval, i.e., at each occurrence of a pulse of the CCNT signal, duty cycle counter 204 is reset, and then commences to count cycles of a DCLK signal generated by duty cycle clock 208. When such counting commences, the inhibit signal on line 214 is high, and as a result decoder 282 selects one of row drivers 284 to energize the row specified by row counter 280. when the count accumulated by duty cycle counter 204 equals the value stored in duty cycle register 206, however, the inhibit signal is driven low, deenergizing the row for the remainder of that row interval. The display level value in duty cycle register 206 therefore controls the amount of time during each row interval that the inhibit signal is high, and thereby controls the intensity of the display.

Figure 14:
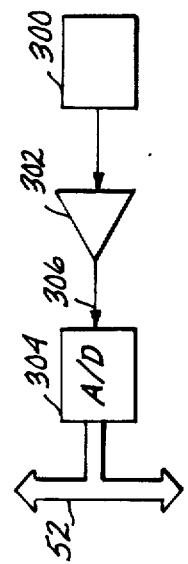
FIG. 14 is a block diagram of one luminance sensor and associated circuitry.

The function of luminance circuit 50 (FIG. 1) is to provide information to the keyboard processor concerning the ambient light level in the vicinity of keyboard 16. In a preferred embodiment of the present invention, luminance circuit 50 comprises a plurality of sensors located at different positions near the keyboard. The use of multiple sensors ensures that a spurious luminance reading will not be obtained when, for example, an individual sensor is blocked or covered. FIG. 14 illustrates one sensor of 300 of luminance circuit 50, together with associated circuitry comprising amplifier 302 and analog-to-digital converter (A/D) 304. Sensor 300 provides an analog signal that is amplified by amplifier 302 to produce an analog luminance signal on line 306. The analog luminance signal is digitized by A/D 304, and keyboard processor 12 reads the digitized luminance value via bus 52. When the keyboard processor has obtained a luminance value from the A/D associated with each sensor, it determines a composite luminance value by averaging the individual luminance values. The composite luminance value is then used to determine the value that is written into duty cycle register 206 (FIG. 9). A suitable component for sensor 300 is the SFH-203 photodiode available from Litronix.

Figure 15:
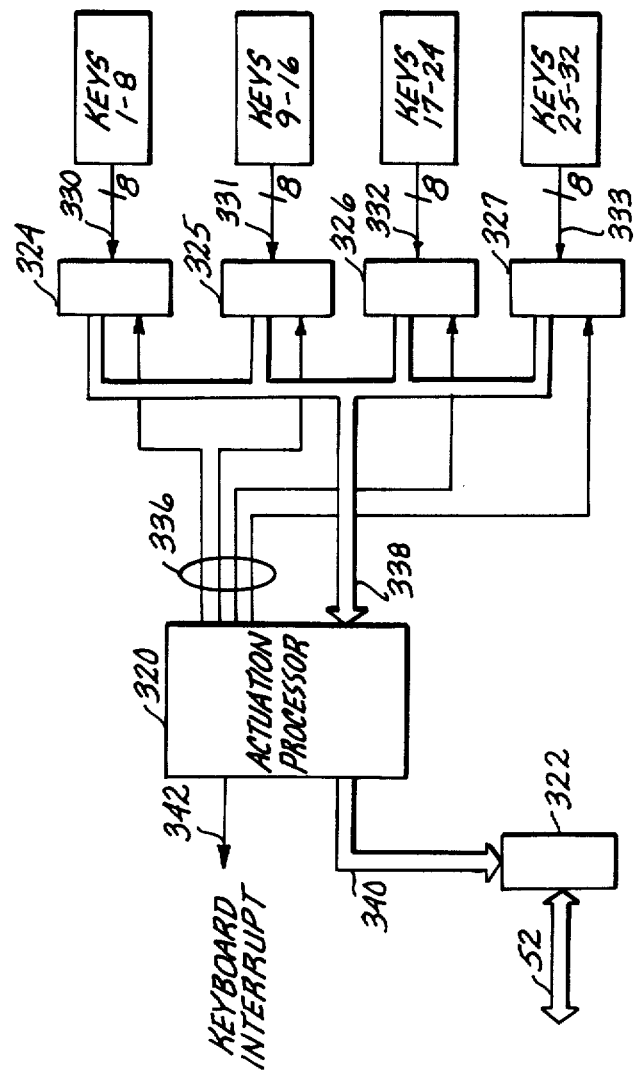
FIG. 15 is a block diagram of the actuation processor and actuation buffers.

Actuation controller 46 and actuation buffers 56 are illustrated in greater detail in FIG. 15. The function of the actuation controller is to monitor keyboard 16 to detect the actuation of switches associated with particular keys. The actuation controller comprises actuation processor 320 and output buffer 322. Actuation processor 320 preferably comprises a single chip microcomputer, a suitable microcomputer being the 8748-8 microcomputer available from Intel. The actuation buffers comprise 8 bit input buffers 324–327. Each of input buffers 324–327 is connected to eight keys by one of data paths 330–333, respectively, such that actuation of a particular key results in the setting of a corresponding bit in one of the input buffers.

Actuation processor 320 cyclically reads the contents of input buffers 324–327 by means of buffer select signals on lines 336. In response to such a buffer select signal, each input buffer sends its contents to the actuation processor via bus 338. The actuation processor examines the received buffer contents to determine whether a bit has been set, i.e., whether a key has been actuated. When a key actuation is detected, the actuation processor sends a keyboard interrupt to keyboard processor 12 via interrupt line 342, and sends actuation data to the keyboard processor via bus 340, output buffer 322 and bus 52. The actuation data identifies the particular key that was actuated. Actuation processor 320 also checks to determine whether any key has remained in a continuously actuated (depressed) condition for more than a predetermined amount of time, e.g., for more than 30 seconds. If a particular key does remain depressed throughout such a time period, the actuation processor masks out that key, and sends actuation data to keyboard controller 12 that identifies the key and indicates that the key is inoperative. As described below, the actuation processor responds by reconfiguring keyboard 16 to eliminate the inoperative key.

Figure 16:
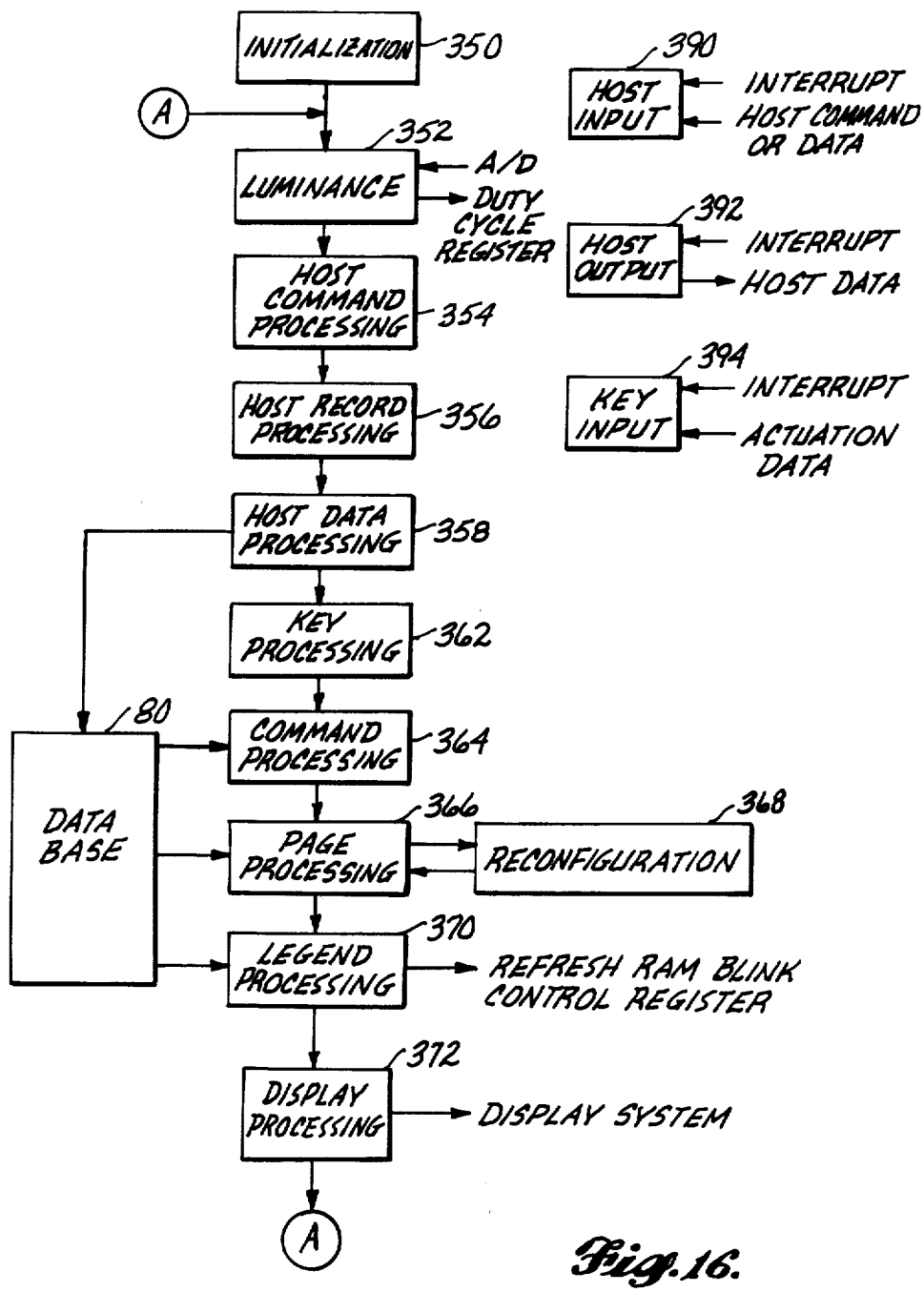
FIG. 16 is a flow diagram for the keyboard processor control program.

FIG. 16 sets forth a flow chart for one preferred embodiment of the control program for CPU 20 of keyboard processor 12. Program execution commences with an initialization routine in block 350. The initialization steps include the initialization of parameters and the enabling of interrupts. The initialization routine of block 350 also copies the first control page of control page table 82 (FIG. 5) into a work area in RAM 22, and may send an appropriate sign-on message to display system 28.

After initialization has been completed, the program enters a main "executive" loop that extends from block 352 to block 372. The program remains in the executive loop except when interrupt signals are received, such interrupts causing the execution of host input routine 390, host output routine 392 or key input routine 394, as described below. FIG. 16 also illustrates data base 80 and the relationships of different program routines thereto.

Block 352 comprises a luminance routine that inputs a luminance value from luminance circuit 50. In a preferred embodiment, the keyboard system includes eight luminance sensors, and the luminance routine sequentially inputs luminance values from the A/Ds associated with the respective sensors during sequential executive loops. When new values have been input from all eight sensors, the luminance routine then averages or otherwise combines the individual luminance values to produce a composite luminance value. The composite luminance value is checked to determine whether it is greater than 4 on a scale of 1 to 256, and whether it differs by more than 2 from the prior composite luminance value. If the new composite luminance value passes both of these test, then it is converted to a display level value and written into duty cycle register 206 (FIG. 9). The conversion of a composite luminance value into a display level value may be accomplished by means of a preestablished relationship between actual display luminance and perceived luminance.

Upon completion of the luminance routine, control sequentially passes to the host command processing routine of block 354, the host record processing routine of block 356, and the host data processing routine of block 358. These three host related routines, together with host input routine 390, control functions related to the transmission of data from host system 10. When the host system wishes to send a character of data to the keyboard processor, it issues an interrupt signal that causes the keyboard processor to execute the host input routine of block 390. The host input routine accepts the character from the host and stores it in an input buffer. If the character is a carriage return, then the host input routine sets a flag indicating that a unit of data has been received from the host system. The host input command processing and host record processing routines respond to this flag in the manner described below.

In a preferred embodiment, data is exchanged between the keyboard processor and the host system in Intel hex format. In such a format, data is transmitted in discrete packets, each packet beginning with a unique record mark and ending with a carriage return. Included within each packet are bytes that indicate the number of bytes in the packet, bytes that indicate the packet type, and check sum bytes. The two packet type code used are zero for "data" and one for "end of record." Data packets include from 1 to 32 bytes of data.

In general, the actual data sent from the host system to the keyboard processor comprises either commands to be executed by the keyboard processor, or data such as the data comprising data base 80. In one preferred embodiment, the keyboard processor is adapted to respond to the following commands from the host system:

| COMMAND | DESCRIPTION |
|---------|-------------|
| P | Download control page |
| L | Download legend record |
| C | Download command record |
| D | Download display record |
| G | Data base complete |
| E | Emergency alert |
| M | Display message |
| U | Upload data base |

The download of data base 80 from the host system to the keyboard processor would begin with the host system sending a packet to the keyboard processor in which the data comprised a single byte, the "P" command. The host system would then send a series of packets in which the data comprised the control pages of control page table 82. Each control page would be sent in multiple packets. When an individual control page had been completely transmitted, an end of record packet would be sent. When control page table 82 had been completely transmitted, then the host system would send an "L" command, followed by the legend records of legend table 84. The host would then send a "C" command, followed by the command table records, a "D" command, followed by the display table records and, finally, the "G" command indicating that data base transmission was complete. The emergency alert command can be used by the host system to force the keyboard processor to interrupt its current operations, and to make a designated control page the active control page. Data representing the designated control page is transmitted by the host system immediately following the "E" command. The message command "M" is followed by one or more data packets containing the text of a message. The keyboard processor responds by displaying the message on display system 28. The "U" command may be used to cause the keyboard processor to upload the data base to the host system.

When a packet is initially received from the host system, i.e., when host input routine of block 390 detects a carriage return and sets the appropriate flag, the host command processing routine of block 354 responds by examining the input buffer and identifying the command. The host command processing routine then either executes the command, or causes appropriate flags to be set to alert other routines to execute the command. In particular, if the command is "P", "L", "C" or "D", the host command processing routine sets a host record flag. In either event, the host command processing routine clears the input buffer as well as the flag that caused the host command processing routine to be executed. As a result, the host command processing routine will not be executed during subsequent program loops until a subsequent packet is ready in the input buffer.

The host record processing routine of block 356 is called during an executive loop whenever the host record flag has been set by the host command processing routine. The host record processing routine examines the input buffer and determines whether a complete packet has been received. If a complete packet is not ready for processing, then the host record processing routine performs no operations for the current executive loop. However, if a complete packet of data is ready in the input buffer, then the host record processing routine examines the packet to determine whether it is an end of record packet. If not, then the data is transferred from the input buffer to a host record buffer, the input buffer is cleared, and the host record processing routine terminates for the current executive loop. When the host record processing routine detects an end of record packet, it sets a host data processing flag.

The host data processing routine of block 358 is executed whenever the host data processing flag has been set by the host record processing routine. The setting of the host data processing flag indicates that a complete record, i.e., a control page, legend record, command record or display record, is available for processing in the host record buffer. The host data processing routine processes such record based upon the last received host command ("PT", "L", "C" or "D"). For control page, command or display records, the data is transferred directly to data base 80. For a legend record, the record is first examined to determine whether it is an ASCII or pixel map format. If the legend record is in ASCII format, it is converted to pixel map format. The legend record is then stored in data base 80. In all cases, a control table associated with data base 80 is updated to indicate that a particular type of record has been added to the data base.

Whenever a key of keyboard 16 is actuated, actuation controller 46 sends an interrupt signal to the keyboard processor that results in the execution of key input routine 394. The key input routine inputs the actuation data from the actuation controller, determines the number of the key to which the actuation data pertains, and checks to determine whether the actuation data indicates that a switch is inoperative. If a switch is inoperative, then an appropriate switch status flag is set. If the actuation data indicates normal key actuation, then the key number is placed in a key input buffer, and a buffer pointer and a key processing flag are incremented. During each executive loop, after the completion of the host data processing routine of block 358, the key processing routine of block 362 checks to see whether the key processing flag is zero. If it is not zero, then the key processing routine gets the number of the key that was actuated from the key input buffer, and compares the key number to the key control flags 94 of the active control page. If the key control flags indicate that the key is active, then a command processing flag is set. If the key is inactive, then no action is taken. Control then passes to the command processing routine of block 364.

The command processing routine of block 364 is executed only when the command processing flag has been set in response to the actuation of an active key. The command processing routine determines whether there is a command associated with the actuated key by examining the command pointer 100 (FIG. 6) corresponding to that key on the active control page. If no command pointer is present for the actuated key, then there is no command to be executed, and the command processing routine is complete. However, if a command pointer is present, then the command processing routine accesses the indicated command in command table 86, and proceeds to execute that command. Typical commands include commands for sending information to host system and for writing a message on display system. The particular commands available for execution by the keyboard processor will, of course, depend upon the nature of the system in which the keyboard processor is utilized, and upon the allocation of functions between the host system and the keyboard processor. In the case where a command specifies that data is to be sent to the host system, the command processing routine converts such data to Intel hex format, and places such data in a host output buffer followed by a carriage return. The command processing routine then sets a host output flag. The host output flag results in a series of interrupts that result in the execution of host output routine 392. Each execution of the host output routine sends one character from the host output buffer to the host system. when the host output routine encounters a carriage return marking the end of a host output record, it resets the host output flag.

Once command processing is complete, control passes to the page processing routine of block 366. The page processing routine determines whether it is necessary to change the active control page and, if so, determines the number of the next active control page. When an active key has been actuated, the page processing routine sets the next active control page equal to the next control page pointer 98 associated with the actuated key. However, the page processing routine may also be adapted to respond to special situations, such as a command to return to the previous active control page or to jump to the "top" control page, i.e., the control page that is loaded by the initialization routine upon system startup. The page processing routine may also be adapted to respond to an emergency alert command from the host system to vector the keyboard processor to an emergency control page, as described above. In any of the above cases, when a new active control page is selected, the selected control page is retrieved from control page table 82 and copied into a work area in RAM 22.

Whenever a new active control page has been selected and copied into the work area, the page processing routine checks to see whether reconfiguration of that control page is required. The page processing routine determines whether or not reconfiguration is required by comparing the key control flags of the new active control page to the switch status flags that are set by the key processing routine whenever an inoperative key is detected. If the comparision indicates that no inoperative keys are active for the active control page, then reconfiguration is not required, and the page processing routine is complete. However, whenever the comparison indicates that one or more of the active keys of the active control page are inoperative, the page processing routine transfers control to the reconfiguration routine of block 368.

The operation of the reconfiguration routine is illustrated schematically in FIGS. 17 and 18. Referring initially to FIG. 17, column 400 illustrates key control flags 94 for the active control page of a hypothetical system having six keys. A key control flag "1" indicates an active key, while a key control flag of "0" indicates an inactive key. The key control flags of column 400 therefore indicate that keys 1, 3, 4 and 6 are active. Column 402 illustrates legend pointers 96 corresponding to the key control flags of column 400. The parenthesis in column 402 illustrate that the legend pointers comprise the addresses of the legends rather than the legends themselves. Keyboard 404 illustrates the legends that would be displayed on the keys in response to key control flags 400 and legend pointers 402. It is assumed that the keys of keyboard 404 are numbered across and down from upper left to lower right. As illustrated, the "active" key control flags for keys 1, 3, 4 and 6 cause the legends A, B, C and D to be displayed on keys 1, 3, 4 and 6. The active control page of FIG. 17 would also include four next page pointers and up to four command pointers, the next page and command pointers being omitted for ease of illustration.

The right hand side of FIG. 17 illustrates the modifications that would be made to the key control flags and legend pointers if key 3 became inoperative. The reconfiguration routine would being by scanning the key control flags downward from the flag corresponding to key 3 to locate the first inactive, operative key. As illustrated in column 400, the first inactive, operative key is key 5. The reconfiguration routine would then make key 5 active and key 3 inactive, to produce key control flags 406. The reconfiguration routine would then relocate the legend pointer (B) corresponding to the inoperative key in a corresponding manner, to produce the legend pointers 408. The corresponding next page and command pointers would also be relocated in a similar manner. As a result of these operations, the keyboard display would correspond to keyboard 410. If the reconfiguration routine were unable to find an operative, inactive key below the position of the inoperative key, it would then scan upward from the inoperative key position in an attempt to find such a key.

FIG. 18 illustrates the operations performed by the reconfiguration routine when the number of active keys exceeds the number of operable keys. Key control flags 420 and legend pointers 422 illustrate an active control page in which all keys are utilized to display legends A-F, the corresponding keyboard being indicated by keyboard 424. If key 1 became inoperative, then the reconfiguration routine would determine that no inactive, operable keys were available, and would therefore divide the control page represented by key control flags 420 and legend pointers 422 into two control pages. In the first control page, illustrated by key control flags 430, legend pointers 432 and keyboard 434, the key control flag for key 1 has been changed to a "0" to indicate the key 1 is inactive, the legend pointer (A) corresponding to key 1 has been removed, and the legend pointer corresponding to key 6 has been modified to point to a "Next Page" legend, abbreviated "N". The nex page and command pointers of the active control page would be modified in a corresponding manner. As a result of these operations, legends A and F no longer appear on the first control page. The second control page, illustrated by key control flags 440, legend pointers 442 and keyboard 444, includes legend pointers to the A and F legends, as well as a pointer to a "Previous Page" legend abbreviated "P". Both the first and second control pages would be placed in the RAM work area, with the first control page remaining the active control page. The next control page pointers corresponding to the "N" and "P" legends would be modified such that actuation of the corresponding keys would transfer control between the two control pages.

The legend processing routine of block 370 and the display processing routine of block 372 are executed whenever a new control page has become the active control page. The function of the legend processing routine is to assemble the legend data for the new active control page, and to send such legend data to refresh RAM 42. The function of the display processing routine is to assemble the display data for the new active control page, and to send such display data to display system 28. The legend processing routine first uses legend pointers 96 to build a legend address table of the addresses of the legend records tht are to sent to the refresh RAM. If a key is to be blank, then the legend processing routine inserts the address of a blank legend in the legend address table. The legend processing routine then generates a low signal on line 190 (FIG. 9) that interrupts the refresh operation of keyboard interface 14, and prepares the refresh RAM to receive data from the keyboard processor. The legend processing routine then writes the legend data to the refresh RAM, via data translator 48, in the order indicated in table 110 of FIG. 7. Blink flags are then extracted from the legend records listed in the legend address table, and the blink flags are assembled into blink data and written into mask RAM 224 (FIG. 11). Line 190 is then driven high, resuming the refresh operations of keyboard interface 14. Once the legend and display processing routines have completed their operations, the executive loop is complete, and control returns to the luminance routine of block 352 to commence the next executive loop.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference of the following claims.

The embodiments of the invention in which an exculsive property or privilege is claimed are defined as follows:

1. A multi-function keyboard system, comprising:
   (a) keyboard means including a plurality of switches and display means for receiving legend data and for displaying a plurality of legends specified by the legend data, the legends being positioned adjacent the switches such that each legend is visually associated with a single switch;
   (b) actuation control means electrically connected to the keyboard means formonitoring the switches and providing, when one of these switches is actuated, an actuation signal identifying the actuated switch;
   (c) processor means comprising
      (i) means for storing a database comprising a plurality of data groups, each data group comprising legend data specifying a legend for at least one of the switches for display by the keyboard means and routing data specifying a next data group functionally associated with at least one of the switches;
      (ii) means for designating one of the data groups as the active data groups;
      (iii) means for receiving the actuation signal; and
      (iv) means responsive to receipt of an actuation signal identifying that a selected switch has been actuated for designating the data group specified by the routing data of the current active data group corresponding to the selected switch as the new active data group; and
   (d) means for causing the legend data of the active data group to be transmitted to the keyboard means;
   said actuation control means comprising means for electronically sensing that a switch is inoperative and for producing a corresponding electronic switch signal that identifies the inoperative switch, said processor means comprising means for receiving the switch signal and reconfiguration means including means for responding to the switch signal by reconfiguring each active data group such that legend data and routing data in the active data group is not associated with switches identified by the switch signal as inoperative.

2. The multifunction keyboard system of claim 1, wherein each data group comprises key control flags identifying the active switches for that data group, and wherein the reconfiguration means comprises means for comparing the key control flags of an active data group to the switches identified as inoperative by the switch signal to determine whether a reconfiguration is required.

3. The multifunction keyboard system of claim 2, wherein the reconfiguration means comprises means operative upon detection of a first switch that is active and inoperative to identify a second switch that is inactive and operative and to modify the key control flags and the legend and routing data such that the second switch assumes the functions of the first switch.

4. The multifunction keyboard system of claim 3, wherein the reconfiguration means comprises means operative upon a determination that there is an active and inoperative switch but no available inactive and operative switches for the active data group for creating a new data group and for dividing the legend and routing data of the active data group between the active data group and the new data group.

5. A multi-function keyboard system, comprising:
   (a) keyboard means including a plurality of switches and display means for receiving legend data and for displaying a plurality of legends specified by the legend data, the legends being positioned adjacent the switches such that each legend is visually associated with a single switch;
   (b) actuation control means electrically connected to the keyboard means for monitoring the switches and providing, when one of these switches is actuated, an actuation signal identifying the actuated switch;
   (c) processor means comprising
      (i) means for storing a database comprising a plurality of data groups, each data group comprising legend data specifying a legend for at least one of the switches for display by the keyboard means and routing data specifying a new data group functionally associated with at least one of the switches;
      (ii) means for designating one of the data groups as the active data group;
      (iii) means for receiving the actuation signal; and
      (iv) means responsive to receipt of an actuation signal identifying that a selected switch has been actuated for designating the data group specified by the routing data of the current active data group corresponding to the selected switch as the new active data group; and
   (d) means for causing the legend data of the active data group to be transmitted to the keyboard means;
   said means for causing the display means to display the legends specified by the legend data comprising a refresh RAM for storing the legend data corresponding to the active data group, and a refresh controller for generating a series of refresh addresses to the refresh RAM, each refresh address being operative to cause the refresh RAM to output a unit of legend data to the keyboard means, said means for causing the display means to display the legends further comprising a data translator for receiving legend data from the processor means and for reformatting the legend data and storing the reformatted legend data in the refresh RAM such that each byte of the data stored in the refresh RAM includes one bit of legend data for each of up to eight keys.

6. The multifunction keyboard system of claim 5, whrein the legend data is stored in the refresh RAM in a plurality of data block, each data block comprising the legend data for a particular group of keys.

7. The multifunction keyboard system of claim 6, wherein the refresh controller is adapted to cause legend data to be transferred from the refresh RAM to the keyboard means by sequentially addressing data from different data blocks.

* * * * *

UNITED STATES PATENT AND TRADEMARK OFFICE
CERTIFICATE OF CORRECTION

PATENT NO. : 4,853,888

DATED : August 1, 1989

INVENTOR(S) : Walter J. Lata et al.

It is certified that error appears in the above-identified patent and that said Letters Patent is hereby corrected as shown below:

| | |
|---|---|
| Column 1, line 35 | "be" should be --by-- |
| Column 3, line 6 | "tthe" should be --the-- |
| Column 3, line 67 | "20communicating" should be --20 communicating-- |
| Column 6, line 48 | "on" should be --one-- |
| Column 6, line 50 | After "as" insert --a-- |
| Column 7, line 26 | "regfister" should be --register-- |
| Column 7, line 47 | "tranferred" should be --transferred-- |
| Column 8, line 62 | "A1-1-A12" should be --A11-A12-- |
| Column 9, line 7 | "on" should be --of-- |
| Column 9, line 51 | "66" should be --266-- |
| Column 11, line 4 | "when" should be --When-- |
| Column 12, line 38 | "test," should be --tests,-- |
| Column 14, line 21 | ""PT"," should be --"P",-- |

UNITED STATES PATENT AND TRADEMARK OFFICE
CERTIFICATE OF CORRECTION

PATENT NO. : 4,853,888

DATED : August 1, 1989

INVENTOR(S) : Walter J. Lata et al.

It is certified that error appears in the above-identified patent and that said Letters Patent is hereby corrected as shown below:

| | |
|---|---|
| Column 15, line 16 | "when" should be --When-- |
| Column 16, line 14 | "being" should be --begin-- |
| Column 16, line 45 | "the" (first occurrence) should be --that-- |
| Column 16, line 49 | "nex" should be --next-- |
| Column 17, line 28 | "appararent" should be --apparent-- |
| Column 17, line 45 / Claim 1, line 9 | "formonitoring" should be --for monitoring-- |
| Column 17, line 58 / Claim 1, line 22 | "groups" should be --group-- |
| Column 20, line 4 | "whrein" should be --wherein-- |
| Column 20, line 5 | "block" should be --blocks-- |

Signed and Sealed this

Seventh Day of August, 1990

Attest:

HARRY F. MANBECK, JR.

*Attesting Officer*     *Commissioner of Patents and Trademarks*